United States Patent [19]

Heidenreich

[11] Patent Number: 5,133,870
[45] Date of Patent: Jul. 28, 1992

[54] TREATMENT OF AQUEOUS DISPERSIONS

[76] Inventor: Hans J. H. Heidenreich, 51 Boulevard Wilson, Aix-les-Bains, France, 73100

[21] Appl. No.: 367,396

[22] Filed: Jun. 16, 1989

[30] Foreign Application Priority Data

Jun. 20, 1988 [FR] France .................. 88 08358

[51] Int. Cl.$^5$ .............................................. C02F 1/52
[52] U.S. Cl. .................................. 210/667; 210/708; 210/724; 210/726; 210/738
[58] Field of Search ............... 210/708, 723, 724, 726, 210/702, 710, 727, 667, 714, 716, 738

[56] References Cited

U.S. PATENT DOCUMENTS

| | | | |
|---|---|---|---|
| 2,345,827 | 4/1944 | Olin | 210/702 |
| 3,446,731 | 5/1969 | Harsh | 210/708 |
| 3,474,033 | 10/1969 | Stout et al. | 210/748 |
| 3,487,928 | 1/1970 | Canevari | 210/708 |
| 3,909,406 | 9/1975 | Lang | 210/716 |
| 4,765,908 | 8/1988 | Monick et al. | 210/667 |
| 4,783,265 | 11/1988 | Timmons | 210/666 |

FOREIGN PATENT DOCUMENTS

| | | | |
|---|---|---|---|
| 2027798 | 2/1971 | Fed. Rep. of Germany | 210/708 |
| 5075563 | 11/1973 | Japan | 210/708 |

Primary Examiner—Peter Hruskoci

[57] ABSTRACT

A highly stable dispersion e.g. an oil-in water emulsion having a pH of from about 4 to about 12 is destabilized by treatment with a composition comprising a precipitant e.g. aluminum sulphate, a clay and a marl.

9 Claims, 3 Drawing Sheets

TREATMENT OF AQUEOUS DISPERSIONS

The invention relates to the treatment of aqueous dispersions and particularly to the separation of the liquid and solid phases of highly stable aqueous dispersions (including emulsions and colloidal suspensions) Examples of dispersions which can be treated by the invention include emulsions comprising water and used working fluids. Some specific examples include used metal working emulsions consisting of an aqueous dispersion phase and a dispersed phase consisting substantially of mineral and synthetic oils stabilised by surfactants, emulsifiers etc. and aqueous dispersions containing dyestuffs, pigments, resins, hydrocarbons, etc., as will be explained below.

It is one object of the invention to provide a method and chemical composition which can readily separate non-miscible phases and/or solid phases from an aqueous phase in a wide range of aqueous dispersions. It is another object to provide such a method and composition to provide directly from such aqueous dispersions water having a substantially neutral pH.

The invention is based on the realisation that a chemical composition comprising a precipitant, a clay and a marl, together with optional additives, can satisfy these objectives.

It is a further object to provide apparatus for use in preparing the composition and for use in contacting the composition and the dispersion in an efficient way.

According to one aspect of the invention there is provided a method for the separation treatment of an aqueous dispersion, the method comprising adding to the dispersion, a precipitant, a clay and a marl to provide a water phase having a substantially neutral pH and a solid phase.

The precipitant is preferably one which will precipitate colloids; it is preferred that the precipitant is one which will provide trivalent ions A preferred precipitant is aluminum sulphate which is known to coagulate and precipitate suspended and colloidal particles in water purification and the treatment of sewage. Iron salts may be used instead.

The clay is preferably a polar clay having a three layer structure. Preferred are natural and synthetic bentonites including montmorillonite. Preferably sodium type montmorillonite salt is used.

Marl is a mineral laid down in the upper Oligocene period. In chemical terms marl is an impure, soft, earthy carbonate rock of marine origin containing varying amounts of sand and clay, intermixed in a loosely knit crystalline structure. Marl is calcium carbonate with other substances which will vary according to the geographical location. Available marls include argillaceous marl, chalky marl, chamotte marl, dolomitic marl, etruria marl, lime marl, limestone marl, marl clay, marl rock, magnesia marl, siliceous marl, etc. The marl may be known under different local names, e g as sea water clay, salt water clay, etc. A preferred marl comprises about 70% $CaCO_3$, about 20% clay, balance $M_gCO_3$. Both the clay and the marl have strong positive electric surface charges when in the form of finely divided powders.

The three ingredients are preferably presented as one composition in powder form or as an aqueous dispersion. The composition may be presented as one package, although the ingredients may with advantage also be added sequentially, the precipitant first and the other powders later, in some cases.

The relative proportion of the three ingredients may be varied widely and will depend interalia on the pH of the dispersion and the pH desired of the separated water phase. In general there will be more marl than aluminum sulphate precipitant Other ingredients may be present Metal salts may be present to increase the electrical conductivity of the oil containing emulsion; sodium chloride is one example and silica gel is another. Carbonaceous materials may be present because of their affinity for low molecular weight or organic compounds such as primary or secondary alcohols and to separate or space apart the aluminum sulphate and marl in the composition. Extra flocculating agents may be present.

The method may be performed at temperatures from say about 0° C. to about 70° C. and at different pressures. The reaction takes place over a period of a few minutes.

While we do not wish the invention to be limited by the following theory, we believe that when the aluminum sulphate or other precipitant is added to the emulsion, it causes coagulation and precipitation of particles which are then absorbed and carried down with the formed aluminum hydroxides with a lowering of the pH value. The marl dissolves at a relatively slower rate so that after the hydrolysis products have been allowed to form and exert a destabilising effect (even where the dispersion contains anionic and/or non-ionic surfactants), the pH rises to a substantially neutral value. The clay binds the solids which precipitate leaving the water substantially free of solids which can then be used directly, e.g. re-used in a water treatment process, added to river water, or the like. More specifically, the method of this invention relies on the interaction between a very large number of particles present in the composition (and possibly formed by chemical interaction between them) and particles dispersed in the dispersion being treated. The components of the composition comprise substances which cause both a strong contraction of the electric double layer surrounding the dispersed particles and which form colloids of opposite charge to that of the particles which are to be removed. In this way phenomena such as Brownian motion and Van der Waals forces prevail over the stabilising forces, causing the formation of increasingly larger aggregates resulting in further destabilisation of the dispersion. This destabilising effect is closely associated with the simultaneous presence of all the ingredients forming these products, which suggests that a synergistic effect is involved. Our evaluations have shown that if the aluminum sulphate is used alone or with the marl, only aqueous dispersions of anionic character will undergo destabilisation. If the clay and/or the marl are used there is no destabilisation effect. If the aluminum sulphate is used in combination with the bentonite clay, destabilisation will occur in the case of some dispersions only and the pH range of about 2.5 to 3. The most surprising fact concerning the effect of the invention is that dispersions can be destabilised in a wide pH range and even at above or around neutral pH. (Known separation agents can only be used to treat fluids having a very narrow pH range. Their use always requires a neutralisation stage in the treatment process because the destabilising effect depends on the isoelectric point for a dispersion or emulsion, usually around pH 3. Now it is just at this pH that hydroxides begin to form from the metal salts used, as in the case of trivalent iron, or have not yet begun to form in the case of aluminum). The invention may be used in the separation treatment of a wide rang of aqueous dispersions, including those for which present methods of separation are considered to be too costly and inefficient. Such dispersions or emulsions can have a wide range of pH values range from about 4 to about 12. One class of dispersions is used in metal working fluids. Such fluids are water based and anionic and contain powders comprising bentonite clays and non-hygroscopic metal salts, oxides and/calcium hydroxide previously treated by carboxylic acid, such as stearic acid, palmitic acid etc., and synthetic polyelectrolytes can be mixed to form powders for metal working fluids. Emulsifiers based on ethylene oxide, triethanolamine, polyglycols, fluorinated surfactants, modified silicones, solid lubricants finely dispersed in a carrier fluid, etc. are non-ionic substances or substances which confer non-ionic behaviour on the other components of an aqueous dispersion. These substances are increasingly used in preparations of aqueous dispersions and emulsions because of their tribological and cooling properties which render them superior to mineral oils. They also make it possible for cationic compounds, such as quaternary ammonium salts, which act as bactericides and/or fungicides, particularly in metal working fluids, to be used.

Emulsions containing organic substances undergo biodegradation to form inorganic and organic peroxides which exert a stabilising effect on the dispersed or emulsified particles. The invention is applicable to aqueous dispersions or emulsions or colloidal suspensions including these ingredients.

One hypothesis which may explain the efficacy of the invention is to assume that sodium chloride and like substances in the composition impede the rapid formation of agglomerations of aluminum hydroxide so that the hydroxide is formed over an extended period of time. The hydroxides function as a Lewis acid which may improve the destabilising effect on the dispersions.

As indicated, part of the destabilising effect of the components of the composition is due to the action of Brownian motion and Van der Waal's forces, which implies, insofar as the Van der Waal's forces are concerned, that collisions occur between the particles of the composition and the particles of the fluids being treated. Relative movement must therefore take place between the composition particles and the dispersion particles at a rate below that at which the sheer stresses are high enough to cause disintegration of aggregations being formed. According to the results of investigations made in this field the best way of fulfilling this condition is to create microturbulence within the reaction mass, where there is a statistical distribution of a larger number of small causes, which according to the theory of hydrodynamic turbulence give rise to "major effects" which can be reproduced in a predetermined and therefore predictable manner.

Compositions of the invention can be used as powder or in the form of aqueous dispersions, which may be applied by direct introduction of the powder or aqueous dispersions into the emulsion being treated, or by countercurrent injection of the aqueous dispersion. The first method is most appropriate to batch operations, the second to continuous operation.

In other aspects, the invention provides apparatus comprising a vessel to receive the dispersion to be treated, an inlet pipe for the powder extending into the vessel, the pipe having an outlet at its lower end and a plurality of passageways in its lower side wall, the passageways being arranged so that upon agitation within the inlet pipe the dispersion and the powder are well mixed to allow the powder to destabilise the dispersion.

In order that the invention may be well understood it will now be described, by way of example, with reference to the accompanying diagrammatic drawings, in which.

Figure 1:
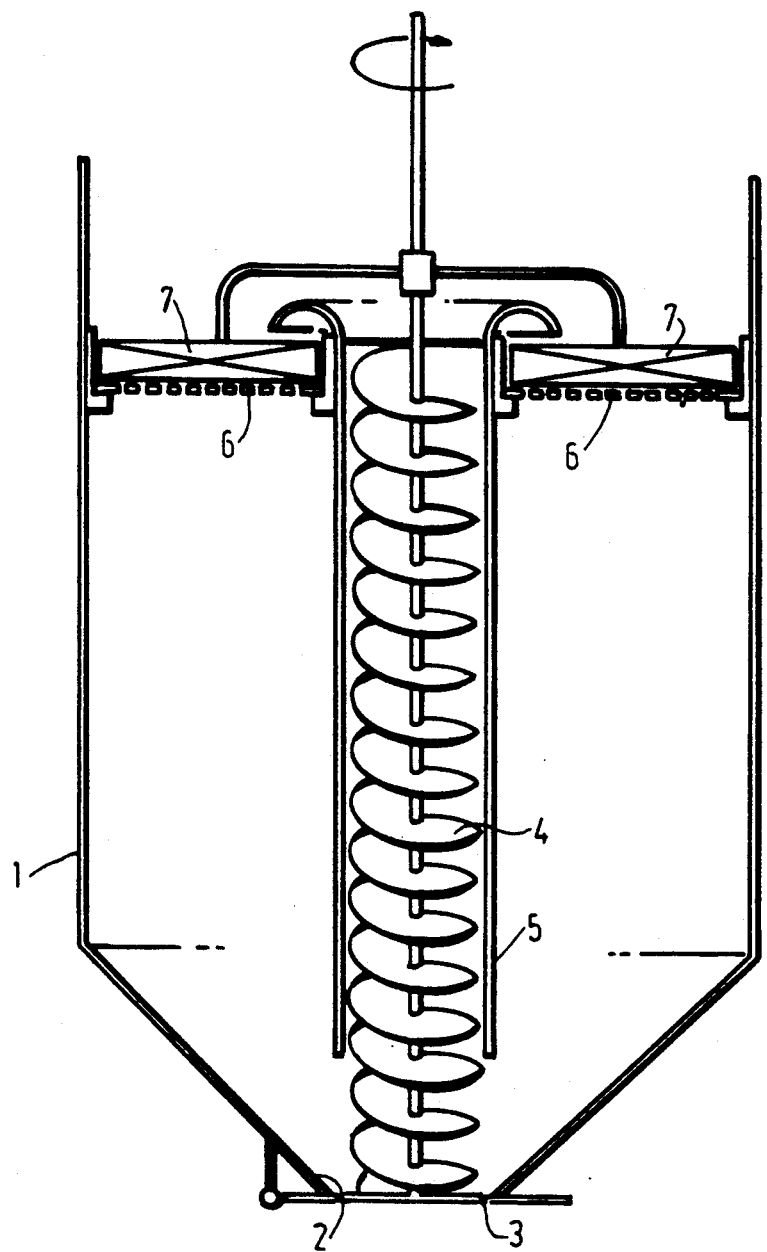
FIG. 1 is a vertical section through one device for mixing the components into a homogeneous powder.

The apparatus of FIG. 1 comprises a conical mixing vessel 1 having a small diameter outlet 2 closable by a plate 3. An Archimedes screw 4 extends vertically towards the outlet 2 and for the majority of its length is surrounded by a small diameter tube 5. A horizontal perforated disc 6 extends between the inside of the vessel 1 and the outside of the tube 5 near the upper end thereof. Two scrapers 7 are connected to the upper end of the shaft of the screw 4 and are arranged to rotate in contact with the upper face of the perforated disc 6. In use, the individual components of the composition are fed by the screw down the tube and emerge in the clearance between the lower end of the tube 5 and the outlet 2. The powder rises to the disc 6 and is urged back by the scrapers 7 When the powders have been thoroughly mixed together, the mixed composition is released via the outlet.

Figure 2:
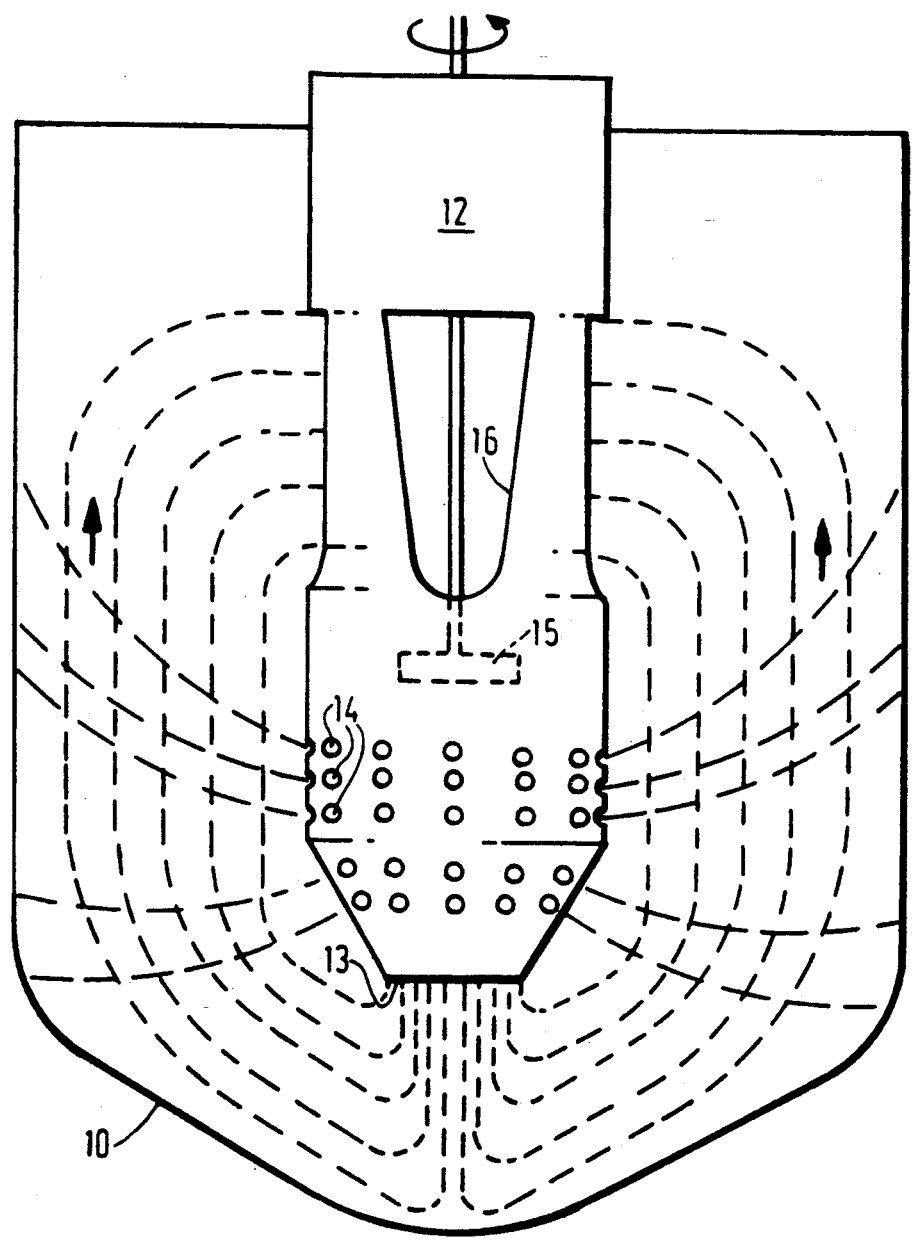
FIG. 2 is a vertical section through a device for use in direct introduction of a powder composition into an emulsion.

The apparatus of FIG. 2 is for direct injection of the powder into the emulsion and comprises a circular or rectangular mixing vessel 10 equipped with a guide tube 12, having an outlet 13 and the lower part of which is provided with side perforations 14. The tube 12 contains a rotary agitator 15 to set the reaction mass in motion. Slots 16 are present in the wall of the tube 12 to allow the reaction mass to flow towards the region where agitation takes place. After the vessel 10 has been filled with the emulsion to be treated the agitator 15 is rotated. This causes a flow of fluid from one side in an axial direction across the cross-section of the outlet 13 and in a radial direction through the perforations 14 in the lower part of the guide tube 12. The radial jets displace the ascending axial flow thus creating a large number of zones of microturbulence which gives rise to intense mixing effects At the same time these radial jets slow down rotational movements of the reaction mass thus preventing dead spots. The fluids are caused to circulate through the slots 16 located upstream of the agitator 15 in the guide tube 12. When a composition of this invention is fed to the guide tube 12 in the treated liquid it is immediately drawn by a vigorous current to the agitator, which breaks up and distributes the components rapidly and uniformly. Because of the different specific gravities of the particles of the composition and those dispersed in the emulsion, and as a consequence the different amounts of motion imparted, relative velocities are set up and these lead to collisions between the particles.

Figure 3:
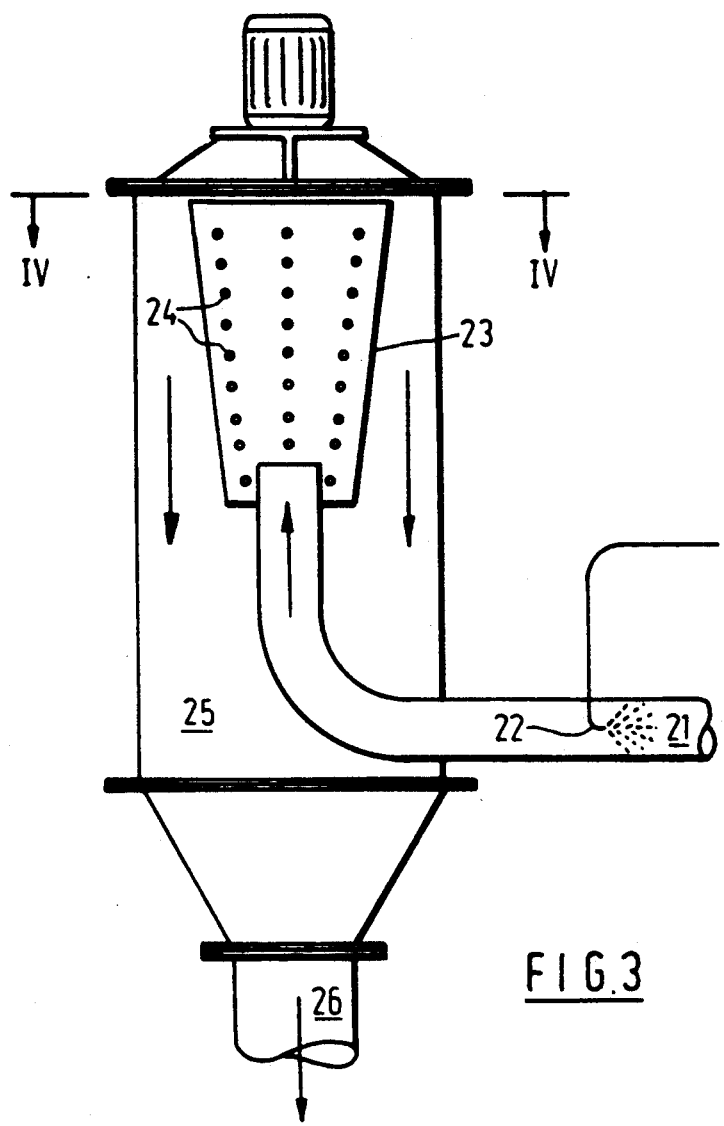
FIG. 3 is a vertical section through a device for use in introducing a powder composition by counterflow injection.
Figure 4:
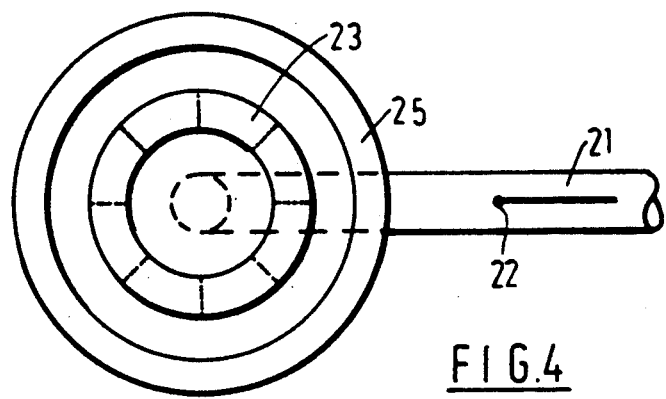
FIG. 4 is a plan view taken on lines IV—IV on FIG. 3.

FIG. 3 shows apparatus for continuous contraflow injection of the powder. The emulsion to be treated flows through tube 21 where a previously prepared aqueous dispersion of the composition is injected in countercurrent flow at a point 22. The premixture is led towards a rotary drum 23 which has perforations 24 about its periphery. Under the action of centrifugal forces the reaction mass flows through these perforations into a post-reaction chamber 25. The reaction mass is then led towards a region of reduced turbulence 26 which favours the formation of large agglomerations of the substances which are to be removed. The rotary drum 23 also creates differences in movement related to the masses of the accelerated particles.

In order that the invention may be well understood it will now be described by way of illustration only with reference to the following examples in which parts are by weight unless otherwise specified.

EXAMPLE 1

The following powders were mixed together to form a composition for the treatment of aqueous dispersions having a substantially neutral pH

| | |
|---|---|
| polar sodium montmorillonite | 799 |
| polar calcium marl | 100 |
| sodium chloride | 80 |
| aluminium sulphate | 20 |
| carbon black | 1 |

EXAMPLE 2

The following powders were mixed together to form a composition for the treatment of aqueous dispersions having a pH between about 5 and about 8

| | |
|---|---|
| polar sodium montmorillonite | 799 |
| polar calcium marl | 100 |
| neutral silica gel | 80 |
| aluminium sulphate | 20 |
| carbon black | 1 |

EXAMPLE 3

The following powders were mixed together to form a composition for the treatment of aqueous dispersions having a pH above 8

| | |
|---|---|
| polar sodium montmorillonite | 799 |
| polar calcium marl | 100 |
| neutral silica gel | 80 |
| aluminium sulphate | 20 |
| carbon black | 1 |

The silica gel is prepared by reacting an aqueous solution of sodium silicate and crystallised aluminum sulphate of formula $Al_2(SO_4)_3 \cdot 18H_2O$. This mixture is stirred in a mixer at 180° C. for for 15 minutes until a homogeneous paste is obtained. This mass is then transferred to a crystalliser where recrystallisation occurs. Further grinding is performed in a spindle grinder or pin mill.

EXAMPLE 4

The composition of Example 1 was used to treat an oil-in-water emulsion, the oil being synthetic. The metalworking fluid comprising an emulsion of synthetic oils in water and containing biodegradation products, the products of the cracking of organic components and very fine dust. The fluid had a substantially neutral pH and the COD (chemical oxygen demand) before treatment was 83,500 mg/l. This effluent was treated with 6 kg of product per $m^3$ on a batch basis. After settling of the separated phase the aqueous phase was clear and colourless and had a COD of 1800 mg/l, equivalent to a reduction of 97.84%.

EXAMPLE 5

Used metalworking fluid comprising a microemulsion based on a mineral oil phase stabilised with a secondary alcohol and having an initial COD of 96,000 mg/l was treated in the manner of Example 4. A clear colourless aqueous phase was obtained, the final COD being 2100 mg/l, (a reduction in COD of 97.81%).

(In relation to Examples 4 and 5 it should be emphasised that the only known way of removing these waste fluids consisted of costly and burdensome evaporation and incineration, which causes a secondary problem of pollution of the atmosphere. Conventional physical chemical processes do not yield acceptable results, and even ultrafiltration leaves an aqueous phase having a final COD value in a range between 9,000 and 25,000 mg/l.)

EXAMPLE 6

Drum wash water from the cosmetics industry consisted mainly of tallow and wool fats emulsified with a mixture of caustic soda and fluorinated surfactant. The starting pH was 12 and the initial COD 42,000 mg/l. After treatment with the composition of Example 3 a reduction in pH to 7.8 was obtained, together with a reduction in COD to 105 mg/l. The treated wash water could be discharged into a watercourse.

EXAMPLE 7

Waste water from a white leather tannery contained emulsified organic substances and 56 mg/l of ionic copper and had a pH of 4 was treated with a composition according to Example 2. The pH of the separated water was 7.7 and copper hydroxide precipitated with the sludge phase.

I claim:

1. A method of separating the liquid and solid phases of aqueous dispersions formed of water and metalworking fluids having a pH in the range of from about 4 to about 12, the method comprising the step of adding to the dispersion a precipitant to coagulate and precipitate solid particles and lower the pH of the dispersion and a marl to raise the pH to a substantially neutral value, and a clay to bind the precipitated solids, thereby to provide a water phase having a substantially neutral pH and a separate solid phase.

2. A method according to claim 1, wherein the precipitant, clay and marl are in powder form.

3. A method according to claim 1, wherein the precipitant is aluminium sulphate or other trivalent ion.

4. A method according to claim 1, wherein the clay is a polar montmorillonite.

5. A method according to claim 4, wherein the clay is a sodium montmorillonite.

6. A method according to claim 1, including adding sodium chloride or silica gel with the precipitant.

7. A method according to claim 1, including adding as a carbonaceous material carbon black with the precipitant.

8. A method according to claim 1, including the additional step of adding a flocculant to precipitate the separated solid phase.

9. A method according to claim 8, wherein the aqueous dispersion contains surfactants and is anionic or non-ionic.

* * * * *